Aug. 7, 1956 J. N. CARMAN, JR 2,757,440

APPARATUS FOR ASSEMBLING SEMICONDUCTOR DEVICES

Filed Jan. 9, 1952 4 Sheets-Sheet 1

INVENTOR.
JUSTICE N. CARMAN JR.,
BY
Seymour M. Rosenberg
ATTORNEY.

APPARATUS FOR ASSEMBLING SEMICONDUCTOR DEVICES

INVENTOR.
JUSTICE N. CARMAN JR.,
BY
Seymour M. Rosenberg
ATTORNEY.

APPARATUS FOR ASSEMBLING SEMICONDUCTOR DEVICES

INVENTOR.
JUSTICE N. CARMAN JR.,
BY
Seymour M. Rosenberg
ATTORNEY.

APPARATUS FOR ASSEMBLING SEMICONDUCTOR DEVICES

Filed Jan. 9, 1952 4 Sheets-Sheet 4

INVENTOR.
JUSTICE N. CARMAN JR.,
BY
Seymour M. Rosenberg
ATTORNEY.

United States Patent Office 2,757,440

Patented Aug. 7, 1956

2,757,440

APPARATUS FOR ASSEMBLING SEMICONDUCTOR DEVICES

Justice N. Carman, Jr., Inglewood, Calif., assignor, by mesne assignments, to Hughes Aircraft Company, a corporation of Delaware Application January 9, 1952, Serial No. 268,385

9 Claims. (Cl. 29—25.3)

This invention relates to apparatus for assembling semiconductor devices, and more particularly, to methods and apparatus for assembling electrical semiconductor devices of the type wherein point contact is made between a whisker conductor and a semiconductor crystal.

In order to more fully comprehend the description of the invention, it is essential that the definition of several terms used be clearly understood. The term "stress" is utilized to describe the various tensile and compressive forces in the whisker and crystal elements of the semiconductor device after contact has been established between the elements. This definition avoids any ambiguity which might result from referring to compressive or tensile forces alone, since both forces occur simultaneously. The phrase "contact forming operation" refers to an operation which improves the electrical and rectification characteristics of the transition region between the whisker element and the crystal element of the semiconductor device. The contact is "formed" by a flow of electrons from one element to the other in the final operation performed on the assembled semiconductor device. A more complete analysis of the forming operation may be found in the M. I. T. Radiation Laboratory series, volume 15, pages 70 to 76, published in 1948 by McGraw-Hill Book Company, Inc., New York, New York.

In recent years, considerable research has been devoted to the development of semiconductor devices, the most notable of which are devices which utilize a conductive wire or whisker of relatively small cross sectional area, stressed at a point contact against a semiconductor crystal element. Undoubtedly, the foremost semiconductor units thus far developed are the transistor unit and the crystal diodes, one of which is disclosed in copending U. S. patent application, Serial No. 153,102, entitled, "Glass-Sealed Semiconductor Crystal Devices," filed March 31, 1950, by Harper Q. North and Justice N. Carman, Jr. Typical of the semiconductor materials used in devices of this type are germanium, silicon and the like.

In the fabrication of semiconductor devices utilizing a point contact between a conductive whisker element and semiconductor crystal element, great care must be taken to properly contact and stress the elements with respect to each other. For example, repeated tests have shown that the nature of the point contact and the stress in the elements of the device have a distinct effect on the electrical properties of the resultant assembled device. It is well known in the art, for example, that stress in the whisker element of a semiconductor device designed primarily for use in low frequency circuitry may be of the order of ten times the stress permissible in the whisker element of a similar device designed for microwave usage.

In the prior art, one machine in common use includes a manually operable micrometer movement for advancing and stressing the whisker and crystal elements of a point contact semiconductor device. Obviously, this or similar schemes for establishing the stress in the elements of the device results in difficulty in determining the precise instant of contact between the elements without rotating the micrometer movement beyond the setting at which contact occurs. Too, even though the initial contact of the elements may be accurately detected, the human error involved in establishing a precise stress in the elements remains, and therefore, inaccuracies in the final stress in the elements ensue. Since the operator must further determine at which micrometer reading the proper stress in the elements will supposedly be achieved, the assembling machine is also subject to mathematical errors by the operator. Moreover, since manual operation of a micrometer movement entails a time-consuming effort to obtain even a slight degree of precision in the stressing operation, the cost of assembling the devices is accordingly higher.

In another assembling machine of the prior art, manually operable screw means, somewhat similar to a micrometer movement, are utilized for advancing and stressing the elements of a semiconductor device, thereby incorporating in the machine those undesirable features and disadvantages of the prior art machine previously described. In addition, in this prior art machine, rotation of the screw means for accomplishing the advancement of the element results in concomitant rotation of the element being advanced, thereby producing an undesirable rotation of the elements of the device with respect to each other after the initial contact between the elements has been made. Inasmuch as the contact point of the whisker element is seldom in true alignment with the axis of rotation of the element being advanced, any rotation of this nature between the elements of the device produces further adverse variations in the electrical characteristics of the assembled semiconductor device. On occasions, the crystal element may be so badly gouged by the whisker element during the stressing operation that the assembled device is rendered useless.

The present invention, on the other hand, provides methods and apparatus for automatically, precisely and rapidly stressing the whisker and crystal elements of point contact semiconductor devices to predetermined values, thereby obviating the above and other disadvantages inherent in the prior art machines. According to the present invention, the methods disclosed for assembling a semiconductor device include the steps of advancing the elements of the device to initially engage each other, detecting the instantaneous engagement of the elements, and automatically stressing the elements to a predetermined value. The assembling methods also include the steps of automatically sealing the stressed device and forming the point contact of the sealed device, in one continuous process. It is evident, therefore, that the methods herein disclosed lend themselves easily to mass production techniques, in addition to providing methods for assembling the devices with a high degree of precision.

The apparatus herein disclosed for assembling point contact semiconductor devices includes several different embodiments of advancing and stressing apparatus incorporating various combinations of electrical, hydraulic and mechanical structure. According to one embodiment of the advancing apparatus, a cam actuated and electromagnetically disengageable tappet mechanism is utilized for advancing and stressing the elements of the device. According to other embodiments, hydraulic means and cam actuated mechanical means are used in the stressing operation, both of the last-mentioned embodiments being provided with electromagnetic means for disengaging the advancing apparatus when the stress in the elements of the device under assembly reaches a predetermined value. Inasmuch as each of the several embodiments functions to automatically and progressively stress the elements of a semiconductor device to a precise predetermined value, the resultant assembled devices are devoid of those inaccuracies introduced by manually operable assembling machines, thereby achieving more uniform electrical characteristics in the assembled devices.

For completing the assembling operation on the semiconductor device, this invention also includes automatic sealing and forming means for respectively sealing the stressed whisker and crystal elements in an envelope, and forming the point contact between the elements. Thus, the assembling apparatus provides means whereby a semiconductor device may be accurately and rapidly assembled in a short time with a high degree of precision.

It is, therefore, an object of this invention to provide methods and apparatus for automatically stressing elements of a point contact semiconductor device to a predetermined value.

It is a further object of this invention to provide an adjustable apparatus for automatically and progressively stressing the elements of a point contact semiconductor device to a predetermined value, wherein said predetermined value may be varied by varying the adjustment of the machine, thereby producing devices similar in structure, but having different electrical properties.

Another object of this invention is to provided apparatus for progressively stressing a plurality of whisker elements against a semi-conductor crystal element to predetermined values, respectively.

Still another object of this invention is to provide an apparatus for uniformly advancing a conductive whisker element toward a semiconductor crystal element for making contact with said crystal element and progressively stressing said whisker element against said crystal element to a predetermined value.

An additional object of this invention is to provide electromagnetic apparatus for advancing, contacting, and progressively stressing to a predetermined value a first element of a point contact semiconductor device with a second element of the device.

Still an additional object of this invention is to provide hydraulically operable apparatus for advancing, contacting, and progressively stressing to a predetermined value a first element of a point contact semiconductor device with a second element of said device.

It is a still further object of this invention to provide mechanical apparatus for advancing a first element of a point contact semiconductor device into contact with a second element of the device, said mechanical apparatus disengaging from said first element when contact has been made and, in disengaging, stressing said first element against said second element to a predetermined value.

It is also an object of this invention to provide apparatus for assembling point contact semiconductor devices wherein a stressed whisker element is connected at a point contact with a crystal element, said apparatus sequentially operating to stress said elements to a predetermined value, to seal said device, and to "form" said point contact.

Furthermore, it is an object of this invention to provide methods and apparatus for stressing, sealing and "forming" the whisker and crystal elements of a point contact semiconductor device.

Additionally, it is an object of this invention to provide methods for advancing, contacting, and stressing to predetermined values the whisker and crystal elements of a point contact semi-conductor device.

It is also an object of this invention to provide the novel features which are believed to be characteristic of the invention as set forth particularly in the appended claims. The invention itself, however, both as to its organization and method of operation, together with further objects and advantages thereof, may be best understood by reference to the following description taken in connection with the accompanying drawings in which several embodiments of the invention are illustrated by way of example. It is to be expressly understood, however, that the drawings are for the purpose of illustration and description only, and are not intended as a definition of the limits of the invention.

Figure 6:
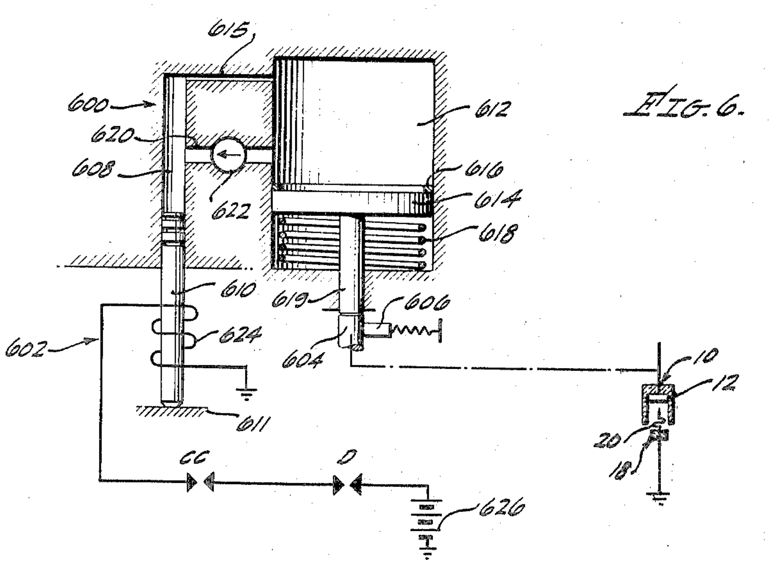
Figure 7:
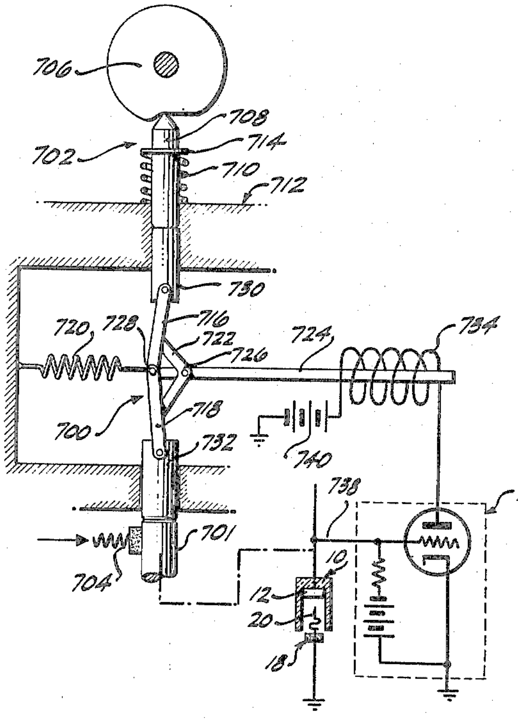

Figs. 5*a* through 5*d* are schematic diagrams of a preferred embodiment of the advancing apparatus taken at various intervals in the advancing cycle thereof;

Fig. 6 is a schematic diagram of another embodiment of the advancing apparatus, incorporating a hydraulic system; and Fig. 7 is a schematic diagram of still another embodiment of the advancing apparatus, incorporating a mechanical toggle mechanism for stressing the semiconductor elements upon initial contact of the elements.

Figure 1:
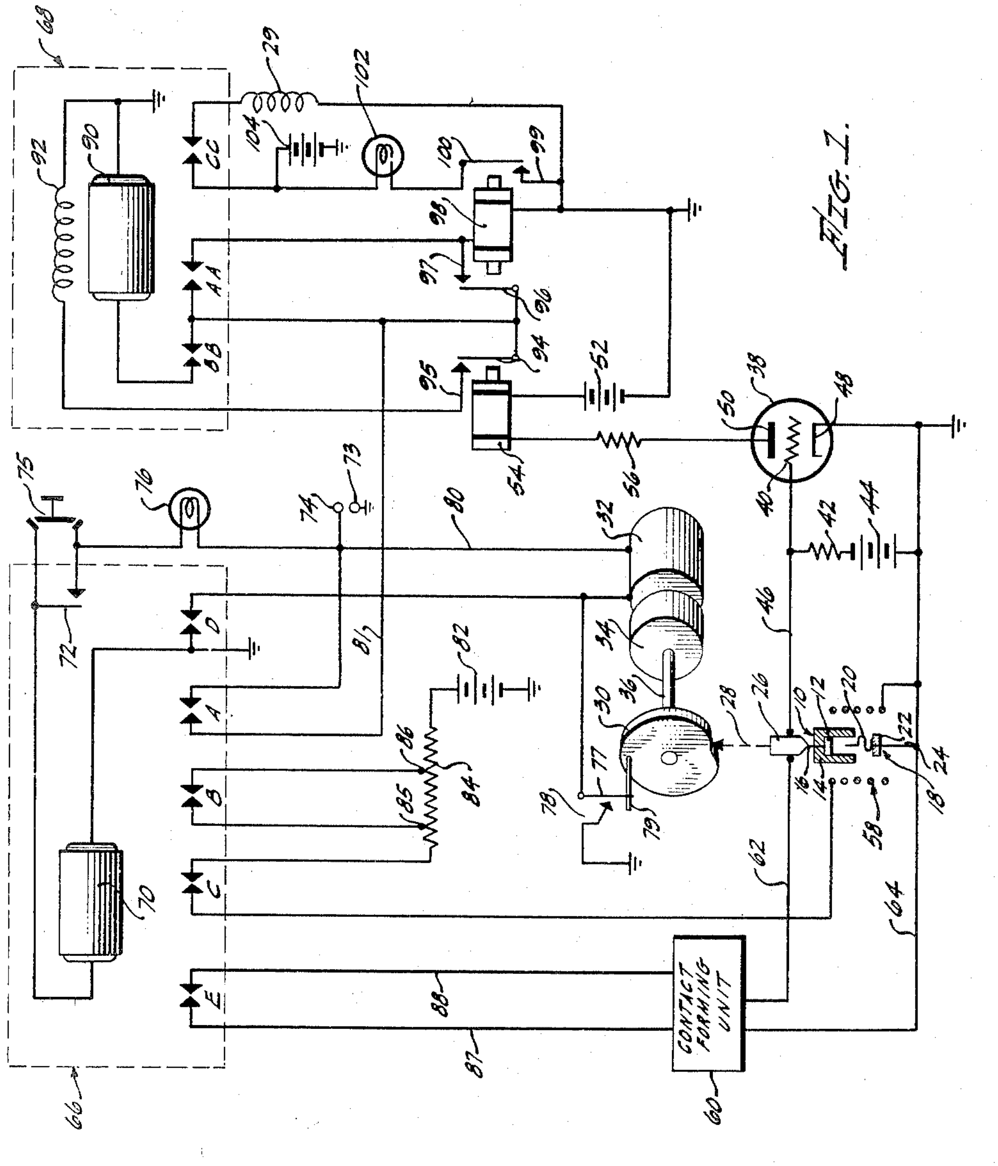
Fig. 1 is a schematic diagram of the electrical circuitry of the assembling apparatus.

Referring now to the drawings, there is shown in Fig. 1 the electrical circuitry of the assembling apparatus according to this invention for automatically assembling a first diode component, generally designated 10, with a second diode component, generally designated 18. Diode component 10 includes a glass envelope 14 surrounding a semiconductor crystal element 12 and a lead wire 16, while diode component 18 includes a lead wire 24 upon which are mounted a conductive whisker element 20 and a glass bead 22. Diode component 10 is held in alignment with diode component 18 by a chuck or holding means 26.

The assembling apparatus of this invention includes five basic elements, namely, an advancing and stressing element, a contact detecting element, a sealing element, a contact forming element, and a timing element for automatically timing the sequence of operations of each of the other elements.

The advancing and stressing element of the assembling apparatus is provided for advancing crystal element 12 to contact and progressively stress against whisker element 20 to a predetermined value. The advancing element includes an electromagnetic cam follower mechanism, diagrammatically designated 28, which is utilized for coupling diode component 10 to a rotatable cam 30, which in turn is coupled to a cam motor 32 by a reduction gear box 34 and a shaft 36. Cam follower mechanism 28 includes an electromagnet winding 29 which is utilized for uncoupling follower mechanism 28 from diode component 10 when the proper stress is achieved in the diode whisker and crystal elements. For purposes of clarity, winding 29 has been separated from that portion of the circuit illustrating the cam follower, and has been included in a portion of the associated stressing circuitry which is described later.

The contact detecting element of the assembling apparatus is provided for detecting the initial contact of crystal element 12 with whisker element 20 during the advancing operation. The contact detecting element includes a vacuum tube, such as triode 38 having an input circuit including a grid 40 and an output circuit including an anode or plate 50. A cathode 48 is common to both input and output circuits. Grid 40 is normally biased below tube cut-off through a biasing resistor 42 by a source of bias potential, such as battery 44, and is connected to diode crystal element 12 through a connecting lead 46, chuck 26 and lead wire 16. Cathode 48, is electrically coupled to ground and lead wire 24 to whisker element 20, while plate 50 is coupled to one terminal of a source of anode potential, such as battery 52, through the winding of a normally unoperated relay 54, and a resistive element 56, the other terminal of battery 52 being grounded. When initial contact between the diode elements is detected, an electrical signal is produced in the output circuit of the contact detecting elements, after which the assembling apparatus functions to stress the diode elements to a predetermined value, as will be seen later in the description of operations.

The sealing element incorporated in the assembling apparatus is provided for sealing the diode elements within an envelope after the diode stressing operation has been completed. The sealing apparatus includes a heating element 58, which encircles diode components 10 and 18, for fusing glass envelope 14 with glass bead 22. Heating element 58 may be any of several suitable heating units, such as, for example, the unit described in the previously-mentioned copending patent application, Serial No. 153,102.

The contact forming element included in the assembling apparatus is provided for forming the electrical and rectification characteristics of the transition region at the point contact between crystal element 12 and whisker element 20, after the diode elements have been sealed within the diode envelope. The contact forming element includes a contact forming unit 60, which is interconnected with diode components 10 and 18 by electrical connections 62 and 64, respectively. Forming unit 60 may be any one of several forming devices known in the art, one of which is disclosed in copending U. S. patent application, Serial No. 202,021, filed December 21, 1950, entitled, "Methods and Circuits for Welding Small Objects," by Jack F. Roach. The circuitry of the above-mentioned application functions to form the point contact of the semiconductor device undergoing assembly by discharging a condenser through a circuit including resistive and inductive elements, and has been applied most satisfactorily in the assembling apparatus. In some instances, it may be desirable to form the sealed and assembled diodes after an aging period has transpired, in which case the forming apparatus and function may be omitted from the assembling apparatus.

In order to properly and sequentially coordinate the various elements used in assembling the point contact semiconductor devices, and to control the stressing of the devices the assembling apparatus also includes a timing element, comprising two timing mechanisms, generally designated 66 and 68, respectively, and associated circuitry, for respectively controlling the overall diode assembling operation and the diode stressing operation.

Timer 66 may be any commercially available timing mechanism for controlling the operational sequence of the assembling apparatus, such as, for example, the "Polyflex Timer," manufactured by the Eagle Signal Corporation of Moline, Illinois. Timer 66 includes a timing motor 70, which, when energized, closes a self-locking contact 72, and sequentially operates to open or close a plurality of timing contact pairs, designated A through E, respectively, in accordance with a predetermined timing sequence, such as that illustrated by the sequence chart of Fig. 2. The contact actuating mechanism, which for purpose of clarity is not shown, includes an electromagnetic clutch and cam assembly, driven by motor 70.

Figure 2:
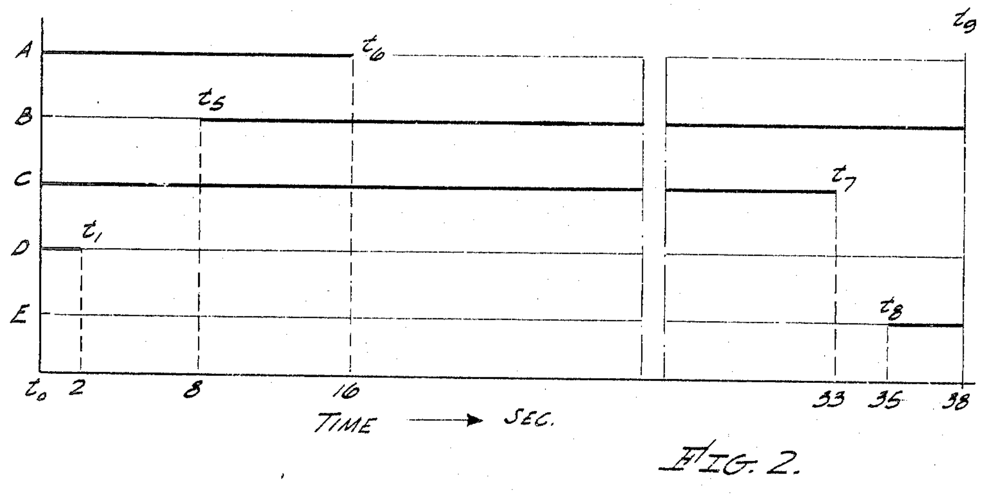
Fig. 2 is an operation sequence chart for the apparatus shown in Fig. 1.

As shown in Fig. 2, wherein the solid lines define the closure periods of contact pairs A through E, the contact actuating mechanism may be adjusted to obtain overlapping in the closure periods of the various paired contacts, should such operation be desirable, and to open or close certain contacts pairs at a predetermined time after other contacts pairs have functioned to open or close an electrical circuit. The total timing period of a timer suitable for controlling the assembling apparatus of this invention is of the order of one-half minute, the precise period being dependent upon the requirements and operational functions of the assembling apparatus.

The associated circuitry of timer 66 includes a source of voltage not shown, having a first output terminal 74 and a second output terminal 73 conneced to ground. Terminal 74 is connected through an indicator lamp 76 to one terminal of a start switch 75 which, in turn, is connected across self-locking contact 72 of timer 66. The other terminal of start switch 75 is connected to one input terminal of timer motor 70, the other input terminal of motor 70 being connected to a first contact of contact pair D, and to ground. The second contact of contact pair D is connected to a first input terminal of cam motor 32, for supplying an operating ground to the motor, the second input terminal of motor 32 being connected to terminal 74 through a lead 80. The first input terminal of cam motor 32 is further connected to a contact 77 of a microswitch 78, the other contact, not designated, of microswitch 78 being grounded. Microswitch 78 is normally open under the control of a pin 79, engaging contact 77 when the assembling apparatus is in an inoperative position.

Terminal 74 of the assembling apparatus is further interconnected by contact pair A of timer 66, and a lead 81 to that portion of the apparatus which times the stressing of the diode elements, as will be later described. Contact pair C of timer 66 is used for connecting one terminal of a potential source, such as battery 82, through a resistive element 84 to one end of heater element 58, the other end of the heater element and the other terminal of battery 82 being grounded. An intermediate portion of resistive element 84, as shown between points 85 and 86, is short circuited by closure of contact pair B of timer 66. Contact pair E, when closed, furnishes a switching circuit for contact forming unit 60 over a pair of interconnecting leads 87 and 88. This completes the description of the circuitry associated with timer 66, with the exception of the circuitry connected to lead 81 which will be more fully described in connection with the description of timer 68, and its associated circuitry.

In an assembling apparatus of the nature illustrated in Fig. 1, it is desirable to have a timing mechanism which is capable of timing for short time intervals of the order of one-half second for accurately timing the progressive stressing of the diode whisker against the crystal. Such a timing mechanism is depicted in Fig. 1 as timer 68. There are several timing devices, available commercially, which satisfy the requirements of the assembling apparatus, one of which is the "Microflex Timer" manufactured by the above-mentioned Eagle Signal Corporation of Moline, Illinois.

Figures 3, 4:
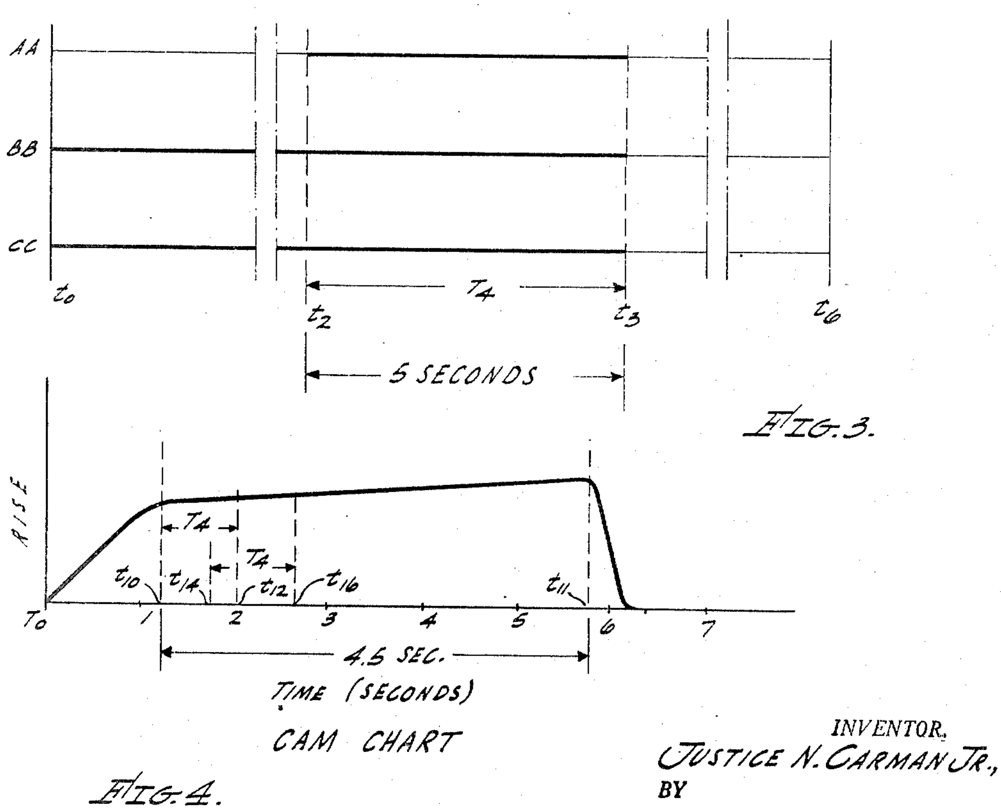
Fig. 3 is a sequence chart of the timer shown in Fig. 1 for timing the stressing of the elements of the semiconductor device.
Fig. 4 is a cam chart for the cam used in several embodiments of the advancing mechanism, showing cam rise versus cam rotation.

Timer 68 includes a timing motor 90, and three separate pairs of contacts, designated AA, BB and CC, having three distinct contact positions, as shown in Fig. 3 which represents a sequence chart for timer 18, the contact position at any instant being dependent upon the mechanical interaction of the timing mechanism. The contact actuating mechanism of timer 68, the details of which have been omitted for the sake of clarity, includes an electromagnetic clutch, of which only winding 92 is shown, for coupling timing motor 90 to a cam assembly which controls the contact positions.

The associated circuitry of timer 68 includes an armature 94 and front contact 95 of relay 54, previously described in connection with the contact detection circuit of the assembling apparatus. Armature 94 is connected to lead 81, while contact 95 is connected to one end of electromagnetic clutch winding 92, the other end of winding 92 being connected to ground and to a first input terminal of timer motor 90. A second input terminal of motor 90 is connected to one contact of contact pair BB of timer 68, the other contact of pair BB being connected to lead 81. Lead 81 is further connected to one contact of contact pair AA of timer 68, the other contact of pair AA being connected to a first winding terminal of a normally unoperated relay 98 which has a second winding terminal connected to ground. Relay 98 includes two front contacts 97 and 99, and two armatures 96 and 100, in operative association with the contacts 97 and 99, respectively. The first winding terminal of relay 98 is further connected to contact 97, which, in cooperation with armature 96 connected to lead 81, constitutes a locking contact for relay 98. Contact 99 is connected to ground, the associated armature 100 being connected through a contact detection lamp 102 to one terminal of a source of potential, such as battery 104, having its other terminal grounded. The one terminal of battery 104 is further electrically connected to one contact of contact pair CC, the other contact of pair CC being connected through winding 29 of cam follower mechanism 28, to ground.

As previously described, winding 29 has been divorced from that portion of Fig. 1 illustrating the cam follower mechanism, although winding 29 constitutes an integral part of that mechanism. The association of elements 29 and 28 will be more fully described in connection with the description of Fig. 5. This, then, completes the description of the electrical circuitry incorporated in the assembling apparatus shown in Fig. 1.

The operation of the assembling apparatus will now be described using the operational sequence diagrams shown in Figs. 2 and 3. When diode component 10, including crystal element 12, is properly aligned with diode component 18, including whisker element 20, in the assembling apparatus, start switch 75 is closed at instantaneous time $t_0$, thereby energizing timing motor 70 of timer 66 and energizing indicator lamp 76, from the source of voltage across terminals 73 and 74. With the energization of timing motor 70, the timing sequence of the assembling apparatus is begun, and, as shown in Fig. 2, at time $t_0$, contact pairs A, C, and D of timer 66 are closed. Contact 72 of timer 66 is also closed when the timer starts to function and thus completes a self-locking circuit which serves to shunt start switch 75 and place timer 66 in self-control.

At time $t_0$, the voltage at terminal 74 is applied through contact pair A of timer 66 to armatures 94 and 96 of unoperated relays 54 and 98, respectively, and to one contact of each of contact pairs AA and BB of timer 68. Referring now to Fig. 3 wherein the solid lines indicate the closure periods of contact pairs AA, BB and CC, it may be seen that at time $t_0$, contact BB is closed. Therefore, the voltage at terminal 74 is applied to, and energizes, timing motor 90 of timer 68. However, in order for timer 68 to become operative, both motor 90 and electromagnetic clutch winding 92 must be energized simultaneously. Therefore, although at time $t_0$ motor 90 is energized, the timer is inoperative, inasmuch as winding 92 is deenergized, the resultant position of the timing contacts being that shown between times $t_0$ and $t_2$, of Fig. 3. The interval between time $t_0$ and instantaneous time $t_2$, which will be described later, therefore constitutes a pretiming interval of the contacts of timer 68, contact pairs BB and CC being closed and contact pair AA being open during this interval.

The closure of contact pair C of timer 66 closes an electrical circuit for heating element 58 from battery 82, through the entirety of resistive element 84 and heating element 58 to ground. In this manner, heating element 58 conducts current of a sufficient magnitude to cause preheating of glass envelope 14 and glass bead 22 of the diode undergoing assembly, in preparation for sealing the entire diode.

When contact pair D of timer 66 is closed at time $t_0$, an operating ground is furnished to one input terminal of cam motor 32 to energize cam motor 32 which rotates at a predetermined speed, and in turn functions to rotate cam 30 at a predetermined speed through the interaction of interconnecting gearbox 34 and shaft 36. Referring now to Fig. 2, it may be seen that at time $t_1$, or approximately two seconds after start switch 75 was initially engaged at time $t_0$, contact pair D of timer 66 is opened. This time delay enables cam 30 to rotate sufficiently so that pin 79 has been disengaged from contact 77 of microswitch 78, consequently closing the microswitch contacts for supplying a second operating ground to cam motor 32. It is readily seen, therefore, that although contacts D of timer 66 are now open, the circuit to cam motor 32 remains closed.

Cam 30, in rotating, causes cam follower mechanism 28 to advance diode component 10 toward diode component 18 in accordance with the rise of cam 30. As will be more fully explained in connection with the description of the specific diode advancing apparatus shown in Fig. 5, cam 30 is machined to produce essentially rapid advance of follower mechanism 28 for approximately the first 90 degrees of cam rotation. At the end of this period, diode crystal element 12 is separated from diode whisker element 20 by a relatively short distance, such as, for example, a distance of the order of ten thousandths of an inch. From this point in the operation of the assembling apparatus, further rotation of cam 30 introduces very uniform advance in follower 28 of the magnitude of twenty thousandths of an inch for the remaining 270 degrees of cam rotation. Thus, during the period when follower 28 engages the uniform rise periphery of cam 30, diode crystal element 12 will be slowly advanced to engage whisker element 20 at a point contact.

At the instant when contact is initially made between the diode whisker and crystal elements, ground is connected through the point contact of the elements and lead 46 to grid 40 of triode 38. With grid 40 grounded, triode 38 conducts, thereby providing an operating current to relay 54, which, in operating, closes armature 94 on contact 95, thus applying the voltage at terminal 74 to winding 92 of timer 68. Therefore, upon contact of whisker element 20 and crystal element 12, that is at time $t_2$ of Fig. 3, clutch winding 92 of timer 68 is energized, and timer 68 is rendered operative and commences to time for the predetermined interval depicted as $T_4$ of Fig. 3. This interval constitutes the timing interval of timer 68, all of contact pairs AA, BB, and CC being closed, and may be adjusted to meet the requirements of the assembling apparatus.

Closure of contacts AA of timer 68, at time $t_2$, applies the voltage at terminal 74 to the winding of relay 98, which operates and closes armatures 96 and 100 on associated contacts 97 and 99, respectively, thereby respectively locking relay 98 and energizing indicator lamp 102. Therefore, at instant $t_2$, the assembling apparatus provides a visual indication that diode whisker element 20 and crystal element 12 have made contact with each other. As will be disclosed in connection with Fig. 5, the energization of lamp 102 may be used with certain other visual information furnished by the assembling apparatus for determining if the diode elements are being properly stressed.

As previously stated, timer 68 is adjusted to time for a predetermined interval $T_4$, Fig. 3, at the end of which interval cam 30 will have rotated a predetermined number of degrees from its position at the start of the timing interval, thereby stressing the diode whisker and crystal elements to a predetermined value. Instantaneous time $t_3$, or the end of timing interval $T_4$, therefore represents that time at which the stressing of the diode elements has been completed, or phrased differently, time $t_3$ represents that time at which the advance timing has been completed.

As is further shown in Fig. 3, contact pairs AA, BB, and CC are opened at time $t_3$. Contact pair AA, in opening, has no effect on the electrical circuitry of the assembling apparatus, inasmuch as relay 98 is locked over contact 97 and armature 96, as described previously. Contact pair BB, in opening, breaks the circuit to timing motor 90, hence arresting timer 68. However, at time $t_3$, electromagnetic clutch winding 92 of timer 68 remains energized, thereby preventing the timing mechanism from resetting under the action of a restoring spring, not shown. The interval shown between time $t_3$ and a time $t_6$ may, therefore, be considered as a post-timing interval for timer 68.

Contact pair CC of timer 68, when opened, breaks the circuit for electromagnetic cam follower winding 29.

As will be described in connection with the cam follower apparatus of Fig. 5, deenergization of electromagnetic winding 29 uncouples diode component 10 from follower mechanism 28, thereby leaving cam 30 free to complete its cycle of revolution without disturbing the accurate stress applied to the diode elements. Cam 30 continues to rotate until pin 79 engages and opens contact 77 of microswitch 78, at which time the operating ground is removed from cam motor 32 and hence, cam rotation ceases. Thus, the cam and associated follower apparatus are in position for the diode advancing and stressing cycle on the succeeding diode to be assembled.

With the diode elements now properly positioned for final sealing of envelope 14 with glass bead 22, timer 66 closes contact pair B at time $t_5$, Fig. 2. This time is set at some value after the start of operations which assures that the crystal advancing and stressing function of the assembling apparatus has been completed. For example, in Fig. 2 time $t_5$ is shown as occurring eight seconds after time $t_0$. At the instant of closure of contact pair B, an intermediate portion of resistive element 84 is short-circuited, thereby decreasing the resistance in series with heating element 58. Accordingly, the current through heating element 58 increases, which results in a further temperature rise in the vicinity of glass envelope 14 and glass bead 22 of the diode. This temperature rise is of sufficient magnitude to cause preheated envelope 14 to fuse with bead 22, thereby sealing the diode. Obviously, short-circuiting only a portion of resistive element 84 is arbitrary, since the circuitry could easily be modified to short-circuit the entire resistive element 84 dependent upon the voltage available at battery 82 and the current required to fuse envelope 14 and bead 22.

During the interval when the diode sealing operation is taking place, timer 66 opens contact pair A at some instant after the diode advancing and stressing mechanism of the assembling machine has ceased to function. This is shown in Fig. 2 as time $t_6$, which is arbitrarily chosen at 16 seconds after time $t_0$. With contact pair A open, the voltage at terminal 74 is removed from armature 94 of relay 54, armature 96 of relay 98 and from contact pairs AA and BB of timer 68. Thus relay 98, having had its locking circuit opened, is released; and contact indicator lamp 102 is extinguished. Furthermore, since the voltage at terminal 74 is removed from armature 94 of relay 54, electromagnetic clutch winding 92 of timer 68 is deenergized. Timer 68, therefore, reverts to the initial contact closure found at time $t_0$, Fig. 3, with contact pair AA open, and contact pairs BB and CC closed. Contact pair CC, in reclosing, again energizes winding 29 in preparation for operation upon the succeeding crystal diode to be assembled. However, since at this time cam motor 32 is inoperative and cam follower mechanism 28 is in its raised position, there is no danger of disturbing the relative positioning of the diode elements. This will more readily be seen when the cam follower mechanism of Fig. 5 is described.

Timer 66, in continuing its timing cycle, opens timer contact pair C at instantaneous time $t_7$, Fig. 2, thereby breaking the circuit to heating element 58. Time $t_7$ is chosen to be at a sufficient time after time $t_0$ to ensure that the fusing of diode envelope 14 with bead 22 is complete. In Fig. 2, time $t_7$ is shown as occurring 33 seconds after time $t_0$. Opening the circuit to heating element 58 allows the fused portions of the sealed diode to cool.

Although physical assembling of the component elements of the point contact semiconductor diode is now completed, if desired, the contact forming operation may be performed on the assembled diode by the assembling apparatus of this invention. Assuming that in this instance it has been found desirable to include the forming operation with the assembling operation, timer 68 is preset to close contact pair E at such time that the cooling of the sealed diode envelope has progressed to a point at which contact forming may be satisfactorily accomplished.

This time is shown as instantaneous time $t_8$ in Fig. 2, occurring 35 seconds after time $t_0$. At time $t_8$, closure of contact pair E furnishes a switching circuit to contact forming unit 60 over leads 87 and 88, the forming unit, in turn, providing a current which is conducted through the point contact of diode crystal element 12 with whisker element 20 by leads 62 and 64. This current is, of course, of such polarity and instantaneous magnitude to properly accomplish the contact forming described in the previously-mentioned copending Patent Application, Serial No. 202,021.

Inasmuch as the contact forming operation consumes a very short period of time, of the order of one second, timer 66 functions to open self-locking contact 72 at a predetermined instant $t_9$, occurring at a sufficient time after time $t_0$ to ensure that the operational cycle of the assembling apparatus has been completed. In Fig. 2, time $t_9$ is shown as occurring 38 seconds after time $t_0$. When contact 72 is opened, the voltage at terminal 74 is removed from the timing motor 70, thereby resetting the entire timing mechanism of timer 66 in preparation for the assembling operation to be performed on the succeeding diode. It is to be noted that when contact 72 is opened, indicator lamp 76 is extinguished, giving visual indication that the diode assembling cycle has been completed.

It is to be understood that the length of the timing intervals and the sequence of contact closures of timer 66 may be varied to perform the steps of the above-described assembling operation in a manner different from that shown in Fig. 2. For example, the envelope preheating and sealing intervals may be changed to obtain either more rapid or slower sealing of the diode envelope. In addition, the stressing of the whisker element with the crystal element of the diode may be varied in several manners. For example, cam 30 may be replaced by a cam having a different rate of rise for the 270° of uniform cam rise. On the other hand, inasmuch as substituting different cams would be considered relatively expensive, the adjustment of timer 68 may be varied so that interval $T_4$, i. e., the interval between times $t_2$ and $t_3$, Fig. 3, may be either increased or decreased, thereby respectively increasing or decreasing the stressing of the whisker and crystal elements of the diode. Indeed, as previously disclosed, such measures are often resorted to, inasmuch as diodes intended for audio frequency use may have stresses applied to the diode elements by a .002″ advance of the cam follower, whereas in the manufacture of diodes for use in microwave circuitry, a follower advance of .0005″ is seldom exceeded in stressing the diode whisker and crystal elements.

Figure 5:
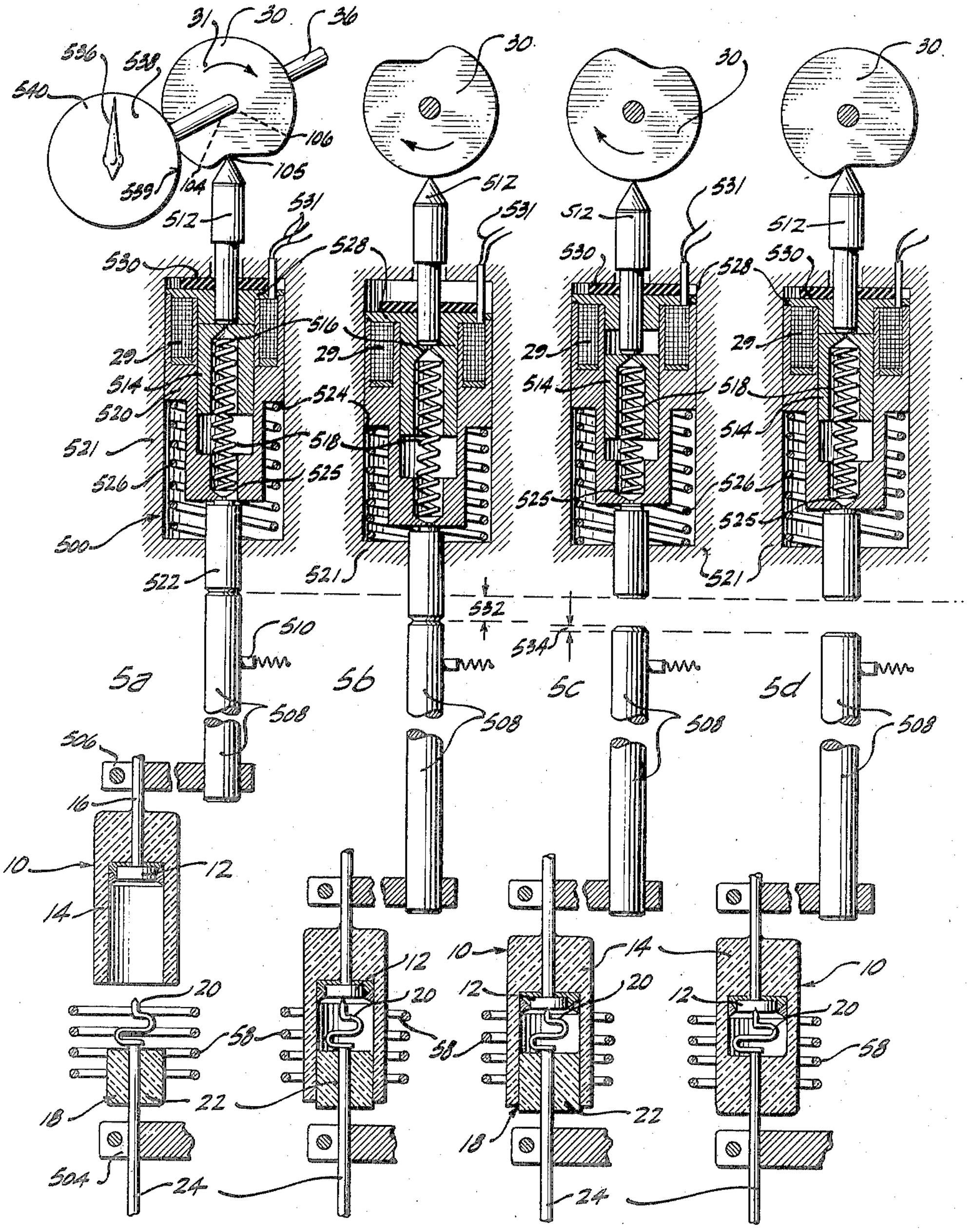

Referring now to Fig. 5, there is shown a preferred embodiment of the advancing apparatus which includes a magnetic cam follower mechanism, generally designated 500, utilized in cooperation with cam 30 for stressing diode crystal element 12 and diode whisker element 20 to a predetermined value.

Figs. 5*a* through 5*d* illustrate the relative positions of cam 30 and cam follower mechanism 500, described in detail below, in advancing crystal element 12 to make contact with and properly stress against whisker element 20 prior to final sealing of the diode envelope. Fig. 5*a* depicts the relationship of follower mechanism 500 and diode elements 12 and 20 at the instant the advancing apparatus is actuated; Fig. 5*b* illustrates the respective relationship of the component parts of follower mechanism 500 at the instant of contact between whisker element 20 and crystal element 12, whereas Fig. 5*c* is indicative of the interaction of the component parts of follower mechanism 500 when the proper stressing has been achieved in whisker element 20 and crystal element 12. In Fig. 5*d*, follower mechanism 500 has once more been returned to the position shown in Fig. 5*a*, and is, therefore, in proper position for a similar advancing and stressing operation to be performed on the succeeding diode to be assembled. It will be noted that in Fig. 5c, the diode elements are in proper position for sealing of glass envelope 14 with glass bead 22. Therefore, in Fig. 5d, the diode is depicted as having been already sealed. This is for purposes of illustration only, since sealing actually occurs after follower mechanism 500 has been returned to the position shown in Fig. 5d.

The advancing apparatus, as exemplified by Fig. 5a includes a chuck or holding means 504 for maintaining diode component 18 in a fixed position, and a chuck or holding means 506 for holding diode component 10 in alignment and movable with respect to diode component 18. Obviously, any suitable holding means may be used in the advancing apparatus, such as, for example, a clamp which holds one diode component in a stationary position, and the other diode component aligned and movable with respect to the first component. A push rod 508 intercouples chuck 506 with follower mechanism 500, a brake mechanism 510 being provided for maintaining push rod 508 and chuck 506 immobile against the force of gravity. Therefore, an additional force must be exerted on push rod 508 in order to advance crystal element 12 to engage and stress against whisker element 20. This force is supplied by the interaction of cam 30 and follower mechanism 500.

Follower mechanism 500 of Fig. 5 includes two basic elements, namely, a cam follower element and a tappet element. During the advancing cycle of the apparatus, the cam follower element is electromagnetically coupled to the tappet element, thereby causing the tappet element to move in accordance with movement of the cam follower element. When the proper stress is achieved in the diode undergoing assembly, the tappet element is uncoupled from the cam follower eelment and returns to a normal position independent of further movement of the cam follower element.

The cam follower element of follower mechanism 500, shown in the normal position in Fig. 5a, includes a cam follower 512 which engages the periphery of cam 30, and a plunger 514 which engages follower 512. Plunger 514 is provided with a spring seat 516 for seating one end of a compression spring 518, the action of spring 518 maintaining plunger 514, cam follower 512 and cam 30 in an engaged relationship. Plunger 514 is made of magnetic material for magnetic coupling with the tappet element, as described in detail below.

The tappet element of the advancing apparatus includes a magnetic tappet housing 520 slidable within a frame member 521 and surrounding electromagnet winding 29. Tappet housing 520 includes a hollow portion in one end for slidably positioning plunger 514 within the tappet housing, a spring seat 525 for seating the other end of spring 518, and a shoulder 524 for engaging one end of a compression spring 526, the other end of spring 526 engaging frame member 521. An annular member 528, made from magnetic material, such as steel, encircles cam follower 512 and is positioned adjacent tappet housing 520 for completing a magnetic circuit between plunger 514 and tappet housing 520 when plunger 514 is positioned relative to housing 520 as shown in Fig. 5a. A bumper washer 530 encircling cam follower 512 and positioned between annnular member 530 and frame member 521 absorbs the shock energy of the returning tappet element during the stressing cycle of the assembling apparatus. A tappet rod 522 is connected to tappet housing 520 for coupling the tappet element to push rod 508. Electromagnet winding 29 is connected through a pair of leads 531 to the associated stressing circuitry, thereby providing a circuit for electromagnetically coupling the cam follower element and the tappet element during the advancing and stressing cycle of the assembling apparatus.

In operation, the advancing apparatus is actuated when the follower element and tappet element of follower mechanism 500 are in the relative position illustrated in Fig. 5a. At this time, electromagnet winding 29 is energized through leads 531, thereby electromagnetically intercoupling plunger 514, annular member 528 and tappet housing 520. Rotation of cam 30 in the direction shown by arrow 31 causes cam follower mechanism 500 to move slidably within frame member 521 in accordance with the rise of cam 30 and against the compressive action of spring 526, thereby moving push rod 508 to advance crystal element 12 toward whisker element 20.

In order to properly disclose the operation of cam 30 and follower mechanism 500, the periphery of cam 30 will be described using the cam chart shown in Fig. 4, which represents the rise of cam 30, throughout one revolution, plotted against time as the abscissa. As previously described, the periphery of cam 30 has a relatively rapid rise portion for moving follower mechanism 500 to rapidly close the gap between whisker element 20 and crystal element 12 after the advancing apparatus has been actuated, and a uniform relatively slow rise portion for contacting and stressing the diode elements. The rapid rise portion of the cam periphery is that portion shown between times $t_0$ and $t_{10}$ of Fig. 4, this portion being shown in Fig. 5a between points 105 and 106 on the cam periphery. The instant $t_{10}$, of course, corresponds to that time when point 106 on the cam periphery is in contact with follower 512.

As follower 512 contacts the periphery of cam 30 shown between points 106 and 104, follower mechanism 500 is moved to advance diode component 10 toward diode component 18 at a slow, uniform rate, this uniform portion of the cam periphery being shown between times $t_{10}$ and $t_{11}$, Fig. 4. At any instant within the uniform cam rise period, whisker element 20 may contact or engage crystal element 12.

Upon contact of crystal element 12 with whisker element 20, the relative positions of the component elements of follower mechanism 500 is that shown in Fig. 5b. Plunger 514, tappet housing 520 and annular member 528 remain electromagnetically coupled, and have been advanced by rotation of cam 30 and against the action of spring 526 a distance 532. Upon initial contact of crystal element 12 with whisker element 22, the contact detection circuit of the assembling apparatus engages the associated timing mechanism utilized for timing the progressive stressing of the diode elements for a predetermined interval.

During the timing interval, cam 30 continues to rotate, thereby advancing crystal element 12 to progressively stress against whisker element 20. At the end of the timing interval, cam 30 and follower mechanism 500 have further advanced the crystal element 12 the predetermined distance 534, Fig. 5c. Inasmuch as the distance crystal element 12 is advanced after initial contact between the crystal and whisker elements is correlated to the stress applied to the elements, the predetermined distance 534 represents a predetermined stress applied to whisker element 20 and crystal element 12.

The stress timing interval and its relationship to the periphery of cam 30 is illustrated in Fig. 4. By way of example, Fig. 4 depicts the diode stressing interval $T_4$ occurring between times $t_{10}$ and $t_{12}$ in one instance, and between times $t_{14}$ and $t_{16}$ in the other instance. In the latter exemplification, initial contact between the whisker and crystal elements occurs after the cam follower has traversed the uniform rise periphery of the cam from instantaneous time $t_{10}$ to instantaneous time $t_{14}$. Obviously, if the initial contact is made prior to time $t_{10}$, or should the timing interval $T_4$ progress beyond time $t_{11}$, the stress applied to the diode elements would be improper, since cam follower 512 would engage a point on the nonuniform portion of the cam periphery during the diode stressing period.

To preclude improper stressing from occurring undetected, cam shaft 36 is provided with an indicator hand 536 which traverses an indicator dial 538. Since the position of hand 536 relative to dial 538 is related to the point on the periphery of cam 30 in contact with follower 512, two suitable markings 539 and 540 may be used on indicator dial 538 for indicating that portion of the cam periphery at which proper stressing may be accomplished. Since contact indicator lamp 94, described in Fig. 1, lights upon initial contact of the diode elements, by merely coordinating the position of hand 536 relative to dial 538 with contact indicating lamp 94, one may determine if the diode under assembly is being properly stressed.

There is shown in Fig. 5c the interaction of the follower and tappet elements of follower mechanism 500 which transpires at the end of the timing interval, or stated differently, at the instant when diode elements 12 and 20 are stressed to a predetermined value. At this instant in the operational cycle of the advancing apparatus, the electrical circuit to electromagnet winding 29 is opened by the associated timing apparatus, thereby deenergizing winding 29 for uncoupling plunger 514, tappet housing 520 and annular member 528. In response to the uncoupling action of deenergized winding 29, spring 526 forces the entire tappet element including tappet housing 520, winding 29, annular member 528 and tappet rod 522 to uncouple from push rod 508, and return to the normal position shown in Fig. 5c. Bumper washer 530 absorbs any shock between the returning tappet element and frame member 521. Follower mechanism 500, therefore, is now in a position where continued rotation of cam 30 does not affect the accurate stress applied to whisker element 20 and crystal element 12.

Since at the time when tappet housing 520 is returned to the normal position shown in Fig. 5c, follower 512 is still engaging cam 30 at a point on the uniform rise portion of the periphery, follower 512 and plunger 516, slidable within tappet housing 520, are maintained in position in accordance with the rise of cam 30. Therefore, tappet housing 520, in returning to the normal position, compresses spring 518 still further, thereby maintaining the engagement of plunger 514 with follower 512 and follower 512 with cam 30. It is obvious that in a device of this nature, spring 526 has a spring constant greater than that of spring 518 for returning the tappet element of follower mechanism 500 to the normal position against the action of spring 518.

After follower mechanism 500 is uncoupled from push rod 508, diode components 10 and 18 are in position for sealing, and rotation of cam 30 in completing the cycle of revolution merely moves follower 512 and plunger 516 against the action of spring 518. When cam 30 completes the cycle of revolution, spring 518 forces plunger 514 and hence follower 512 back to the normal position illustrated in Fig. 5d. Thus plunger 514 once more is positioned relative to tappet housing 520 and annular member 528 for completing a magnetic circuit in follower mechanism 500 for the advancing operation to be performed on the succeeding diode to be assembled.

When the diode components 10 and 18 are positioned as shown in Fig. 5c, and follower mechanism 500 is returned to the position shown in Fig. 5d, heating element 58 raises the temperature of glass envelope 14 and glass bead 22 to a point whereat envelope 14 fuses with bead 22, thereby sealing the stressed crystal element 12 and whisker element 20 within a glass envelope as illustrated in Fig. 5d.

It is to be expressly understood that although Fig. 5 illustrates diode component 10 being advanced toward fixed diode component 18, the relative positions of the two diode components are interchangeable, in which case component 18 is advanced toward fixed component 10. Accordingly, it is to be understood that the relative positions of the components of the point contact semiconductor device, as stated in the appended claims, are interchangeable.

There is shown in Fig. 6 another embodiment of the advancing apparatus which includes electromagnetically actuated hydraulic means for uniformly advancing crystal element 12 to contact and progressively stress against whisker element 20. Accordingly, this embodiment of the advancing apparatus includes a hydraulic element, generally designated 600, and associated electrical circuitry, generally designated 602, for moving a push rod 604 to advance diode component 10 toward diode component 18.

The holding means for maintaining the relative positioning of the diode components are similar to those shown in Fig. 5, and therefore need no further illustration. A brake mechanism 606 maintains push rod 604 and hence diode component 10 immobile against the force of gravity and in position for being acted upon by hydraulic element 600.

Hydraulic element 600 includes a first hydraulic cylinder 608 and a first piston 610 having one end slidable in cylinder 608, piston 610 having its other end normally engaging a stop 611. A second hydraulic cylinder 612, having a second piston 614 mounted slidably therein, is fluid-coupled to cylinder 608 by a conduit 615, for moving piston 614 in response to movement of piston 608. Conduit 615 is of sufficiently small cross sectional area to ensure uniform flow of hydraulic fluid during the advancing operation. If desired, a regulating valve may be included in conduit 615 to control the rate of flow. Piston 614 is seld in a normal position by the interaction of a stop, such as stop ring 616, and a compression spring 618. A tappet rod 619, connected to piston 614, couples piston 614 to push rod 604 when the advancing apparatus is in the normal position shown in Fig. 6. Cylinders 612 and 608 are further hydraulically coupled by a return conduit 620 including a unidirectional check valve 622 which is responsive to a pressure differential between hydraulic cylinders 612 and 608 for rapidly returning hydraulic fluid from cylinder 612 to cylinder 608 after the diode stressing function of the advancing apparatus has been completed.

The associated electrical circuitry 602 includes a solenoid or electromagnetic winding 624 for electromagnetically coupling piston 610 to the timing circuitry of the assembling apparatus. A first input terminal of winding 624 is connected to ground, a second input terminal of winding 624 being connected to one contact of contact pair CC of the diode stressing timer. The other contact of contact pair CC is connected to one contact of contact pair D of the operational sequence timer, the other contact of contact pair D being connected to a first terminal of a source of potential, such as battery 626, which has a second terminal connected to ground.

Contact pair D may be incorporated in this embodiment of the advancing mechanism as shown in Fig. 6 because of the cam and cam follower elements shown in Fig. 5 have been eliminated, thereby obviating the use of a cam motor. In order to properly coordinate hydraulic element 600 with the assemblying apparatus, the closure interval of contact pair D is extended to encompass a timing interval which is of sufficient length to ensure that the diode stressing operation is completed when contact pair D is opened. However, the closure interval of contact pair D should not extend beyond the time when the diode stressing timer is reset. For example, the closure interval should extend from time $t_0$, Fig. 2, to some time between time $t_5$, when the diode stressing operation is completed, and time $t_6$, at which time the diode stressing timer is reset.

In operation, winding 624 is energized by the closure of contact pair D when the advancing apparatus is actuated, thereby electromagnetically applying a force to piston 610 of such magnitude that piston 610 moves within hydraulic cylinder 608 and away from stop 611. Piston 610, in turn, hydraulically moves piston 614 away from stop ring 616 against the action of spring 618, in accordance with the flow of hydraulic fluid from hydraulic cylinder 608, through conduit 615, to hydraulic cylinder 612. Accordingly, tapped rod 619 moves push rod 604 and diode component 10 toward diode component 18 at a substantially uniform rate, thereby advancing crystal element 12 to contact and progressively stress against whisker element 22.

Upon initial contact of the diode elements, the contact detection circuit and diode stressing timer of the assembling apparatus are actuated, thereby timing the progressive stressing of the diode elements for a predetermined interval, or stated differently, timing the progressive stressing to stress the diode elements to a predetermined value.

At the end of the stress timing interval, the diode stressing timer functions to open contact pair CC, thereby deenergizing winding 624 to remove the electromagnetic force from piston 610. At this time, the force applied to piston 614 by the action of spring 618 is such that undirectional check valve 622 is opened, thereby returning hydraulic fluid from hydraulic cylinder 612 to hydraulic cylinder 608 through return conduit 620. Pistons 614 and 610, therefore, return to their normal positions against stops 616 and 611, respectively, under the action of spring 618, thus completing the diode advancing and stressing cycle of the assembling apparatus.

Since hydraulic cylinder 610 may be constructed so as to have a much smaller cross sectional area than cylinder 612, it is readily seen that such an advancing apparatus as illustrated in Fig. 6 may be used as a hydraulic amplifier wherein the advance of piston 614, and hence the intercoupled diode component 10, is a small fraction of the advance of piston 610. This embodiment of the advancing apparatus, therefore, lends itself easily to the assembly of microwave diodes, since it may be recalled that point contact semiconductor devices designed for microwave usage are stressed to relatively low values.

Hydraulic element 600 of Fig. 6 may also be incorporated with a cam and cam follower, similar to those shown in Fig. 5, to obtain still another advancing mechanism. When this is done, the cam follower acts as the piston in cylinder 606, and a suitable solenoid activated valve is connected to hydraulic cylinder 612 for releasing the hydraulic pressure in cylinder 612 when the proper diode stressing is obtained. In such an embodiment, the solenoid is therefore the electromagnetic component connected to the timing mechanism. Such an advancing device, of course, incorporates a source of hydraulic liquid under pressure for refilling the cylinders with hydraulic fluid at the end of each advancing cycle. Inasmuch as such an advancing apparatus is obviously taught by the apparatus shown in Figs. 5 and 6, a drawing of the specific apparatus has been omitted.

There is shown in Fig. 7 still another embodiment of the advancing apparatus which includes cam actuated mechanical means for advancing crystal element 12 to contact and stress against whisker element 20. In this embodiment, a toggle mechanism, generally designated 700, intercouples a push rod 701 and a follower element, generally designated 702. Toggle mechanism 700, as will be later described, is used for automatically stressing whisker element 20 against crystal element 12 to a predetermined value immediately upon initial contact of the diode whisker and crystal elements.

The holding or chuck means for holding diode components 10 and 18 may be any suitable apparatus, such as that shown in Fig. 5. Therefore, diode component 10 is shown diagrammatically coupled to push rod 701 which is held immobile against the force of gravity by a brake mechanism 704. In order to move push rod 701 and thereby advance crystal element 12 toward whisker element 20, a cam 706, engaging follower element 702, is used in cooperation with toggle mechanism 700.

Follower element 702 includes a cam follower 708 which is held in contact with cam 706 by a spring 710 tensioned between a frame member 712 and a collar 714 attached to follower 708. Cam 706 has a periphery similar to the periphery of cam 30, Fig. 5, and therefore needs no further description. Follower 708 is used for intercoupling cam 30 with toggle mechanism 700 to move toggle mechanism 700 in accordance with the rise of cam 706 when cam 706 is rotated.

Toggle mechanism 700 includues two interconnected toggle links, 716 and 718, normally restrained in a toggle position by a spring 720 and a stop 722. Stop 722 is connected to a plunger 724 by a pin 726, plunger 724 being also connected to links 716 and 718 by a pin 728. Two toggle members, 730 and 732, slidable within frame member 712 couple toggle links 716 and 718 to follower 708 and push rod 701, respectively, when the advancing apparatus is in the normal position illustrated in Fig. 7. Plunger 724 is made of magnetic material for coacting with a solenoid winding 734, thereby providing electromagnetic means for actuating toggle mechanism 700.

Inasmuch as this embodiment of the advancing apparatus automatically stresses the diode elements 12 and 20 to a predetermined value upon initial contact of the elements, a timing mechanism is no longer used for timing a stressing interval. Therefore, a contact detection circuit similar to the circuit shown in Fig. 1, and generally designated 736, has its input end connected to diode components 10 and 18 through a lead 738 and ground, respectively, the output end of contact detection circuit 736 being connected across a series connection of solenoid winding 734 and a source of potential, such as battery 740.

When the advancing apparatus shown in Fig. 7 is actuated, cam 706 rotates and advances follower 708 in accordance with the cam rise. Push rod 701, and hence diode component 10, is advanced accordingly through the intercoupling relationship of toggle member 730, toggle links 716, 718 and stop 722 in combination, and toggle member 732. Thus, with toggle mechanism 700 in the normal toggle position, diode crystal element 12 is advanced in accordance with the rise of cam 706 to contact diode whisker element 20.

Upon contact of crystal 12 with whisker 20, contact detention circuit 736 provides an electrical signal for energizing solenoid winding 734, which in turn electromagnetically applies a force to plunger 724 for moving plunger 724 against the action of spring 720. Plunger 724 thereby actuates toggle mechanism 700 to move in a toggle movement to an operated position, in which position pin 728, interconnecting links 716 and 718 and plunger 724 is to the right, as viewed in Fig. 7, of a center line 731, taken through toggle members 730 and 732.

Since toggle member 730 is restrained by follower 708 and frame member 712 from moving in the direction of the force applied on member 730 by the toggle movement, toggle links 716 and 718, in moving to the position at which the links are in alignment with each other, will further advance diode component 12 a predetermined distance toward diode component 18, or stated differently, the toggle movement of toggle links 716 and 718 will progressively stress crystal element 12 against whisker element 20 to a predetermined value.

After the diode elements are properly stressed, toggle links 716 and 718 continue in the toggle movement beyond the point at which toggle links 716 and 718 are in alignment, to the operated position for toggle mechanism 700, thereby uncoupling toggle member 732 from push rod 701. Cam 700 is now free to complete the cycle of cam revolution without affecting the relative positoning of the diode elements and diode component 10 is properly positioned with respect to diode component 18 for sealing of the diode envelope.

Toggle mechanism 700 remains in an operated position until the assembled diode is removed from the assembling apparatus, at which time the input circuit to contact detection circuit 736 is opened, thereby deenergizing solenoid winding 734 and allowing toggle mechanism 700 to return to the normal position under the action of spring 720.

Two obvious advantages of this embodiment of the advancing mechanism are, firstly, the contact stressing timer is eliminated from the assembling machine, and secondly, cam 700 may be machined to higher tolerances because stressing of the diode elements results from the actuation of the toggle mechanism and is independent of any further rotation of cam 706.

While the description of the invention herein disclosed considers apparatus as applied to the assembling of point contact semiconductor diodes wherein a fused glass envelope seals the assembled diode unit, it is to be expressly understood that the advancing apparatus, as shown in its several embodiments in the drawings, may be used with facility in the assembly of any diode of the point contact type, such as, for example, diodes having envelopes which are soldered, spot welded or press fitted. Furthermore, the apparatus and methods herein disclosed are applicable to the transistor art, wherein it is necessary to stress two whisker elements against a semiconductor crystal at point contacts on the crystal. This may be accomplished by merely duplicating the advancing apparatus disclosed in this invention.

It is thus seen that the present invention provides methods and apparatus for advancing, stressing and assembling the component elements of point contact semiconductor devices. It should be understood, of course, that the foregoing disclosure relates only to preferred embodiments, and that numerous modifications and alterations may be made therein without departing from the spirit and scope of the invention.

What is claimed as new is:

1. An apparatus for assembling semiconductor devices of the type wherein a first element is stressed against a second element, said apparatus including: advancing means coupled to said first element for advancing said first element to contact with and progressively stress against said second element; and electrical means electrically coupled to said elements and to said advancing means, said electrical means being responsive to the initial electrical contact of said elements for arresting the advance of said first element when said first element has advanced a predetermined distance beyond the point of initial contact, said advancing means including a rotatable cam having a predetermined rise, means for rotating said cam, cam follower means coupled to said cam and responsive to the cam rotation for moving in accordance with said cam rise, movable tappet means including a tappet member and an electromagnet winding electrically connected to said electrical means and energizable for electromagnetically coupling said tappet member to said follower means, said tappet member being coupled to said first element and responsive to said movement of said follower means for moving said first element to contact and progressively stress against said second element, said electromagnet winding being responsive to said electrical means for uncoupling said tappet member from said follower means when said first element has advanced said predetermined distance.

2. The apparatus defined in claim 1 wherein said cam follower means includes: a cam follower engaging said cam; a plunger engaging said follower; means for maintaining said engagement of said plunger with said follower and said follower with said cam; and wherein said tappet member includes: a magnetic tappet housing surrounding said electromagnet winding and having a hollow portion in a first end thereof, said plunger being slidably positioned therein; a tappet rod engaging a second end of said tappet housing and coupled to said first element; said winding electromagnetically coupling said plunger to said tappet housing for moving said tappet housing in accordance with said follower movement when said winding is energized; and means coupled to said tappet rod for uncoupling said tappet rod from said first element when said tappet member is uncoupled from said follower means.

3. The apparatus defined in claim 1 wherein said cam has a cam periphery which includes a first portion having a relatively high rise rate for moving said tappet means to rapidly advance said first element towards said second element, and a second portion of relatively low uniform rise rate and adjacent said first portion for further advancing said first element to contact and progressively stress against said second element.

4. An apparatus for assembling semiconductor devices of the type wherein a first element is stressed against a second element, said apparatus including: advancing means coupled to said first element for advancing said first element to contact with and progressively stress against said second element; and electrical means electrically coupled to said elements and to said advancing means, said electrical means being responsive to the initial electrical contact of said elements for arresting the advance of said first element when said first element has advanced a predetermined distance beyond the point of initial contact, said electrical means including an electronic detector electrically connected to each of said first and second elements, said detector being responsive to said electrical contact of said elements for providing an electrical signal, and timing means electrically coupled to said advancing means and to said detector and responsive to said electrical signal for uncoupling said advancing means from said first element at the end of a predetermined time interval after the initial electrical contact.

5. The apparatus defined in claim 4 wherein said detector comprises a vacuum tube having an input circuit connected to said first and second elements and an output circuit coupled to said timing means, said vacuum tube being responsive to said electrical contact of said elements for producing said electrical signal across said output circuit.

6. An apparatus for assembling point contact semiconductor devices of the type wherein first and second elements are stressed against each other within a glass envelope, said apparatus including: first means for maintaining said first element in a fixed position; second means, movable with respect to said first means, for holding said second element in alignment with said first element; advancing means coupled to said second means for moving said second means to advance said second element to initially engage and progressively stress against said first element at a point contact; electrical means electrically connected to said elements and to said advancing means and responsive to said initial engagement of said elements for uncoupling said advancing means from said second means at the end of a predetermined time interval after said initial engagement; and sealing means, electrically coupled to said electrical means, for sealing said glass envelope after said advancing means has been uncoupled from said second means.

7. The apparatus defined in claim 6, which also includes forming means, electrically coupled to said electrical means and responsive to said sealing of said envelope for forming said point contact.

8. An apparatus for assembling point contact semiconductor devices of the type wherein said first and second elements are stressed against each other within a glass envelope, said apparatus including: advancing means, coupled to said second element for moving said second element at a predetermined rate to contact with and progressively stress against said first element; electrical means, electrically connected to said first and second elements and to said advancing means, and responsive to said contact of said first and second elements for uncoupling said advancing means from said second element at a predetermined time after said contact of said elements; and sealing means, electrically coupled to said electrical means, and being operable for a predetermined interval after said predetermined time to seal said elements within said envelope.

9. An apparatus for assembling first and second components of a point contact semiconductor device wherein said first component includes a lead wire having a glass bead and a whisker element mounted thereon, and wherein said second component includes a lead wire having a crystal element and a glass envelope mounted thereon, said glass envelope surrounding said crystal element, said apparatus comprising: first means for holding said first component in a fixed position; second means, movable with respect to said first means for holding said second component to maintain said crystal element in alignment with said whisker element; third means, coupled to said second means for moving said second means to advance said crystal element to initially contact with and progressively stress against said whisker element; electrical means, coupled to said elements and to said third means, said electrical means being responsive to said contact of said elements for continuing the operation of said third means for a predetermined interval after said contact between said elements; and sealing means, coupled to said electrical means and positioned adjacent said envelope, said sealing means being responsive to said electrical means for heating said glass envelope and said glass bead to fuse said envelope with said bead after said predetermined interval.

References Cited in the file of this patent

UNITED STATES PATENTS

| | | |
|---|---|---|
| 2,241,794 | Stull | May 13, 1941 |
| 2,572,993 | Douglas et al. | Oct. 30, 1951 |
| 2,603,692 | Scaff et al. | July 15, 1952 |
| 2,649,560 | Blair | Aug. 18, 1953 |
| 2,694,168 | North et al. | Nov. 9, 1954 |